Jan. 7, 1969          F. A. STRAUB          3,420,587
LOW FRICTION SPHERICAL BEARING
Original Filed Aug. 21, 1964
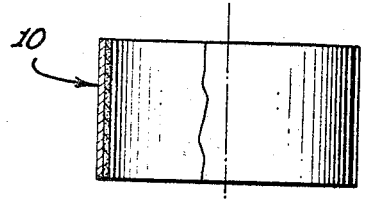
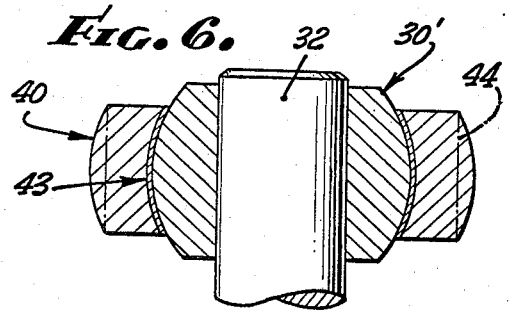
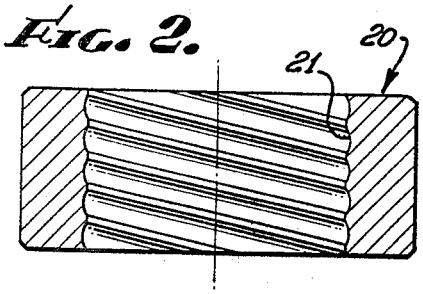
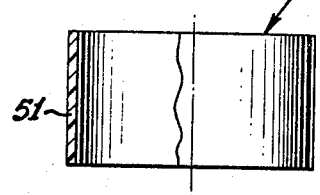
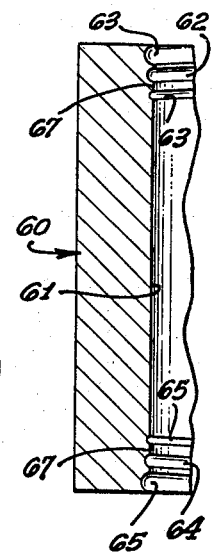
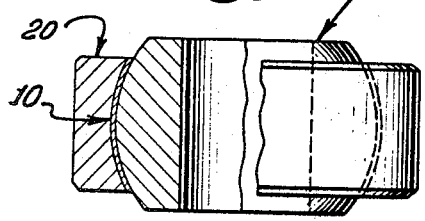
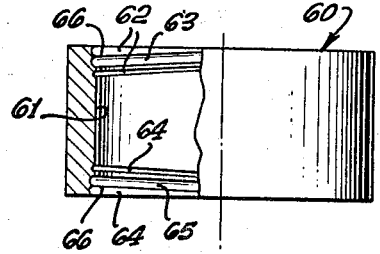
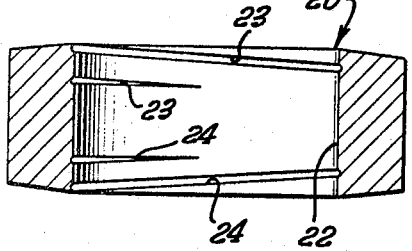
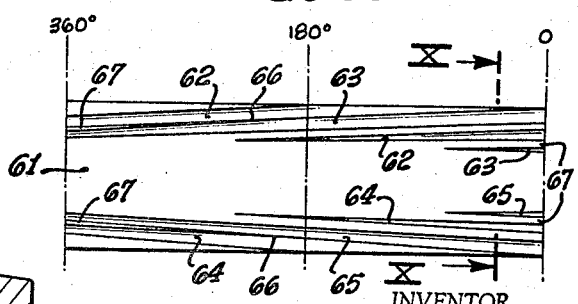
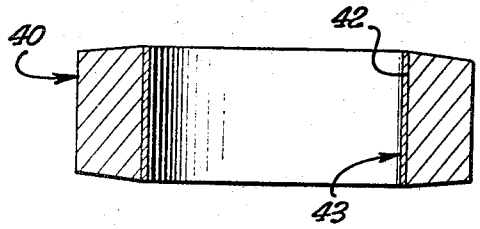
INVENTOR.
FREDERICK A. STRAUB
BY
Miketta and Glenny
ATTORNEYS.

United States Patent Office 3,420,587
Patented Jan. 7, 1969

3,420,587
LOW FRICTION SPHERICAL BEARING
Frederick A. Straub, 4222 Los Nietos Drive,
Los Angeles, Calif. 90027
Application Aug. 21, 1964, Ser. No. 391,128, now Patent No. 3,268,983, dated Aug. 30, 1966, which in turn is a continuation-in-part of application Ser. No. 296,604, filed July 22, 1963, now abandoned. Divided and this application May 5, 1966, Ser. No. 547,982
U.S. Cl. 308—72     5 Claims
Int. Cl. F16c 23/04

ABSTRACT OF THE DISCLOSURE

A liner of thin bearing material is provided between an outer bearing race ring and in inner or central bearing element wherein portions of the liner are mechanically locked into at least one spiral depression provided within the bearing race ring inner surface, the width of said depression being narrower in portions adjacent axial ends of said ring to restrain said liner from shifting with respect to said race ring on relative rotation between the central bearing element and the outer bearing race ring.

---

This application is a division application of my co-pending application Ser. No. 391,128 filed Aug. 21, 1964, now Patent No. 3,268,983 entitled "Method of Making Low Friction Spherical Bearings" which is a continuation-in-part of my prior application Ser. No. 296,604 filed July 22, 1963, which was co-pending with application Ser. No. 391,128 and is now abandoned.

This invention pertains to self-aligning, spherical, self-lubricating and non-galling bearings and particularly, to such bearings wherein a liner of low friction or bearing material is positioned between the inner ball and outer race member of the bearing.

Spherical bearings have been manufactured heretofore for many years (see Fiegel, U.S. Patent 1,693,748, for example). Such original spherical self-aligning bearings ordinarily included a centrally positioned inner ball member restrained within an outer race member, both the ball and the race being made of suitable metal. These bearings had to be lubricated. In more recent years the use of low-friction materials such as "Teflon" fabric, including fibers of polymerized tetra-fluoro-ethylene, together with cotton and even glass fibers, has been suggested as in Patent 3,063,133. These fabrics are generally coated on the back with a bondable resin and strips of this fabric are bonded to the internal cylindrical surface of a retaining ring or race ring prior to or after the press-forming of the ring around the central ball-shaped element. It has been found that a great deal of care must be taken in using these fabrics and that the resulting bearings have some disadvantages. For example, it is necessary to obtain a non-directional finish on the internal surface of the ring in order to obtain a good bond; machine finishing of such surfaces is not entirely satisfactory. Moreover, in order to get good bond and adhesion between the layer of fabric and the internal surface of the ring, the surface must be completely free of grease, oil, dirt or other materials. Since these synthetic resins, having a low coefficient of friction, tend to cold flow under pressure, the fabrics fracture and distort. Moreover, under load these fibrous materials have a tendency to deflect or creep. If the bearing liner creeps or deflects under constant loading over a period of time, it may not be possible to maintain a given alignment for a shaft riding in the lining. This is particularly critical where a series of bearings with a series of shafts are sought to be held in alignment to each other and where the loading thereon is uneven. The relatively large coefficient of thermal expansion for thermoplastic liners used heretofore also can cause a hot operating low friction bearing employing such liners to tighten up and run hotter and hotter until it fails. The poor heat conductor characteristics of these prior liners also prevent adequate dissipation of heat which occurs under heavy loading or high velocity operating conditions such that sublimation of the liner occurs, causing bearing failure.

It has been suggested heretofore that bushings could be made by taking sheet metal, bonding to a surface of such sheet metal a porous layer of sintered bearing metal such layer being impregnated with a resin having a low coefficient of friction, such as a fluorocarbon resin. This sheet material can then be cut into suitable strips and rolled so as to form a bushing. However, no one has been able to successfully utilize bushings of such sheet material in spherical bearings heretofore.

The present invention is directed to a smiple and economical spherical bearing utilizing low-friction resins. The invention contemplates holding said resins in operative position by means of a porous layer of sintered metal and producing a finished bearing which properly dissipates the heat generated by interfacial friction, high velocities, repeated oscillations and high loads, the porous layer of sintered metal being provided as a liner in the bearing race.

It is also an object of the present invention to disclose and provide a spherical bearing having a one piece race ring, a virtually spherical ball and a layer of material containing such low-friction resinous material between the ball and race ring, said resinous material being restrained from uncontrolled rotation and shifting with respect to the race by engagement with thread-like depressions formed in the inner surface of the race ring.

The present invention contemplates and it is a principal object of the invention to disclose and provide a simple and economical bearing utilizing tubular low-friction liners of any thermo-setting plastic wherein rotation of the liner within the bearing when under load is prevented.

These and various other advantages and objects of the invention will become apparent from the following description, reference being had to the appended drawings in which:

FIG. 1 is a side elevation, partly in section, of a thin metal bushing carrying a self-lubricating, internal coating;

FIG. 2 is an axial section taken through a race ring provided with certain holding means, such ring being adapted to receive the bushing shown in FIG. 1;

FIG. 3 is a side elevation, partly in section, of one form of spherical bearing manufactured by the use of the elements shown in FIGS. 1 and 2;

FIG. 4 is an axial section taken through a modified form of race ring adapted for use in the bearing and method of the present invention;

FIG. 5 is an axial section through a still further form of race ring for use in making bearings in accordance with this invention;

FIG. 6 is an axial section through a spherical bearing assembly immediately after a press-forming operation, in which the race ring of FIG. 5 has been employed;

FIG. 7 is a side elevation, partly in section, of a tubular liner of any thermo-setting plastic composition;

FIG. 8 is an axial section taken through a modified form of race ring for use in the bearing and method in accordance with the present invention;

FIG. 9 is an unrolled representation of the race ring of FIG. 8 showing all 360° of the inner surface thereof; and FIG. 10 is a detail section view of the race ring of FIG. 8 taken at the plane X—X in FIG. 9.

As previously indicated, soft rolled sheet steel has been heretofore plated with a bondable metal such as copper and then covered with a metallic powder. Various metals and alloys such as copper, tin-bronze, lead-bronze, silver, iron, etc., may be used, and by a proper selection of grain size these metal powders can then be sintered together and to the copper plated sheet to form a porous layer of desired thickness. A layer ranging from about 0.005 to 0.001 inch is adequate, although somewhat thicker layers may be used if desired. This porous layer is then impregnated with a fluorocarbon or other low-friction resin with the application of heat and pressure. The resulting sheet material can now be cut into strips and carefully rolled into bushings, the ends of the strips being in abutting relation.

It is not possible to employ such a bushing in a spherical bearing by placing such a bushing within an outer race ring and press-forming the two together around the centrally positioned ball because a bearing so made, in subsequent use, will cause the inner bushing to spin and rotate or travel outwardly. However, the present invention, in part at least, is directed toward the efficient utilization of such bushings.

As indicated in FIG. 1, a bushing similar to the one described hereinabove can be made by employing a thin sheet of soft or alloy steel or other durable metal, the internal surface of such bushing carrying the porous impregnated layer described hereinabove. The total thickness of such bushing indicated at 10 need not exceed 0.03 inch and may preferably range from 0.01 to 0.06 inch in thickness, including the compressed internal coating of porous sintered metal impregnated with thermoplastics or the like.

FIG. 2 illustrates a form of outer race ring 20 having an internal diameter adapted to receive the bushing 10. It is to be noted, however, that the internal surface of this race ring 20 is provided with very shallow, steeply pitched, thread-like depressions 21. These depressions are preferably between about .009 and .012 inch deep. Race ring 20 is preferably made of a material having a higher tensile strength and high hardness than that employed in bushing 10. After the bushing has been placed within the race ring 20, the assembly is now positioned around a central hardened steel element such as the truncated, bored ball 30. The combined bushing and ring are press-formed around the ball by the application of forces directed towards the center of the ball element 30, sufficient to force the metal of the ring into a position of permanent deformation with the bushing and in suitable rotational bearing contact to the smooth outer spherical surface of the ball 30. During such press-forming operation, the inner surface of the ring 20 is compressed, whereas the outer surface of the ring and portions adjacent thereto are stretched. The compression of the metal of the ring 20 in areas adjacent the somewhat corrugated or ribbed surface causes the width of the thread-like recesses 21 to become narrower adjacent the axial ends of the ring and to pinch the sheet metal backing of the bushing 10 deformed into such recesses. This mechanical interlock firmly and non-shiftably holds the bushing within the ring. After such press-forming the end faces and outer face of the ring are machined into the form indicated in FIG. 3 and the resulting bearing is now ready for use.

As indicated in FIG. 4 the ring 20′ may have its end faces cut at a slight conical angle so as to present an inner surface 22 which is wider than the outer surface. As shown in FIG. 4, the central portion of this inner surface 22 is smooth so as to snugly receive the bushing 10. It is to be noted, however, that the inner surface of ring 20′ is also provided with steeply inclined or pitched very shallow grooves 23 and 24 adjacent the ends of the surface. Moreover, it may be desirable to have these interrupted grooves 23 and 24 inclined in opposite directions as indicated. These grooves are not continuous and do not extend from one end of the bore 22 to the other; it is only necessary that a groove performs approximately one revolution around the bore, and preferably tapers off, becoming more shallow and merging into the surface of the bore as indicated in the drawing. This has the advantage of presenting a smooth surface throughout the central area of the bore. However, after the bushing 10 has been inserted into the ring 20′ and the assembly has been press-formed around a centrally positioned element having a smooth outer spherical zone, a complete long-lived non-galling, self-lubricating, self-aligning bearing is obtained, free of the disadvantages heretofore noted in a description of bearings which employ fabrics containing Teflon.

An alternative form of bushing or liner 50 is shown in FIG. 7. Liner 50 is tubular and it may be made of any low-friction plastic or plastic composition material, which is generally thermo-setting, or other bearing materials such as bronze alloys, etc. Such plastics may include fluorocarbons, methacrylates, sterols and plastics having characteristics similar to those of Teflon and Mylar, for example. Plastic compositions having softening points above 250°–300° F. are preferred and may contain finely divided lead, copper or other metallic or inorganic particles. The thickness of the liner wall 51 is preferably between about .020 inch and about .060 inch. Thicker walled liners may be employed when the bearing will be subjected to only light loads and moderate rotational speeds.

An alternative form of race ring particularly adapted for use with the liner 50 is shown in FIGS. 8, 9 and 10. Race ring 60 of FIG. 8 is provided with an internal diameter adapter to receive the bushing 50 of FIG. 7. As particularly contemplated within the present invention, the inner surface 61 of race ring 60 is provided with shallow, steeply pitched, thread-like depressions or grooves 62, 63, 64 and 65. These depressions or grooves may be turned into the inner surface 61 of ring 60 just as through they were internal threads, but oppositely inclined from the ends of the race ring. Each of the depressions or grooves are tapered and become more shallow as they progress inwardly of the race to merge into the inner surface 61 of the race ring 60 at spaced margins of a medial zone of the inner surface 61. This central or medial portion of the race ring is left without such grooves or depressions 62 to provide good load carrying characteristics to the bearing. As best seen in FIG. 10, the grooves or internal threads 62, 63, 64 and 65 each become shallower and narrower as they progress inwardly of the race ring. In the exemplary embodiment of FIGS. 8, 9 and 10, a double pitch thread has been shown at each marginal zone of the race ring inner surface 61 with the individual threads, 62 and 63, for example, starting about 180° from each other, as best shown in the unrolled representation of inner surface 61 in FIG. 9. The internal threads initially form a crest 66 between them until the narrowing of each thread 62, 63, 64 and 65 leaves a flat 67 between adjacent threads, as best shown in FIG. 9. It has been found that by turning the grooves or depressions 62, 63, 64 and 65 into the race ring with a multiple pitch (a double pitch in the exemplary embodiment of FIGS. 8, 9 and 10), a stronger mechanical interlock can be effected between the liner, as liner 50, and the outer race ring 60. The race ring 60 may be formed about the liner 50 and an inner bearing member as in the embodiments of FIGS. 1 through 4 without the use of adhesives or bonding materials to hold the liner 50 within the race ring 60. The thermo-setting or metallic bearing liner 50 may be warmed or preheated before insertion into the race ring to facilitate interlock with the locking grooves and the assembly also heated to complete the mechanical interlocking within the bearing race and inner ball or bearing member, portions thereof extending into and being locked in the shallow depressions or grooves 62, 63, 64 and 65. These grooves or depressions are preferably between about .009 and about .012 inch deep and prevent the liner 50 from rotating within the race ring 60 when the bearing is in use. Bearings made from the exemplary plastic or metallic liner 50 and outer race ring 60 of FIGS. 7 and 8 are particularly suitable for bearing applications requiring medium to hrigh speeds and medium to low loads.

In FIG. 5 there is illustrated another race ring 40, having an interanl cylindrical surface 42 provided with an integral, bonded, porous bearing metal layer, containing a low friction resin, such layer being indicated at 43. The internal diameter of the ring 40, including its internal layer 43, is such so as to snugly fit around a suitable central element having a spherical zone surface. Rings of the character illustrated in FIG. 5 may be made as follows: a hollow tube of suitable metal and provided with an interior cylindrical surface of the proper diameter is subjetced to a plating operation whereby such internal surface is plated with a suitable bondable metal, such as copper. The tube is preferably supported in a horizontal position, rotated about its axis, a weighed or measured amount of selected powdered metal is inserted into the tube, and the tube is externally heated during rotation so as to cause the powdered metal to adhere to, become bonded to, and sintered together in the form of a uniformed layer on the inner surface of such tubing, the temperatures, atmospheres, rotational speeds and quantities being factors which influence the proper formation of a porous layer of such powdered metal. After the powdered metal being employed has been introduced, it is desirable to introduce a proportion of very finely powdered polytetra-fluoro-ethylene or similar low-friction, resinous material. High rotational speeds during this sintering operation are desirable in order to cause a compacting of the layer being formed on the internal surfaces of the tube. After the powdered metal has been sintered on the sheet steel, forming a porous layer of metal thereon, then the resinous low-friction material is introduced into the porous interlaced structure. The tube can then be cut into rings of suitable width. A ball or central element having a desired diameter and a smooth spherical zone such as the ball 30' is now firmly mounted upon the pin 32 and the ring 40 placed therearound. The assembly is now press-formed, the ring having a sufficient amount of force applied thereto (the force being directed towards the center of the ball 30') to permanently deform the metal of the ring so as to hold the impregnated layer 43 in rotational bearing relation to the central element or ball 30'. FIG. 6 illustrates the position of the parts at the end of such press-forming operation. The assembled race and ball are now removed from the pin and the outer surfaces of the ring properly machined and chamfered as, for example, along the lines 44.

It should be understood that the foregoing detailed description of various embodiments of a spherical bearing and the methods of making same are exemplary in nature only and that the scope of the invention is not limited thereby, but is defined by the following claims.

I claim:
1. A composite bearing assembly comprising:
   a central bearing element having a generally smooth spehrical zone outer surface;
   an outer bearing race ring formed about said inner bearing element and having opposite axial ends and an inner surface provided with shallow spiral depressions therein at least in marginal zones of said surface adjacent said ends, the width of said depressions being narrowed in their outer end portions adjacent both axial ends of said ring; and
   a liner of thin bearing material within said ring in rotational bearing relation to said central bearing element, said liner being permanently deformed and mechanically locked into said depressions with portions of said liner being pinched in the narrowed portions of said depression whereby said liner is restrained from shifting with respect to said race ring on relative rotation between said central bearing element and the assembled outer bearing race ring.

2. The bearing assembly of claim 1 wherein said liner comprises:
   a thin strip of metal formed into a generally tubular bushing deformed and locked into said spiral depression;
   a porous layer of bearing metal sintered together and bonded to said strip of metal on an inner surface thereof; and
   particles of a low coefficient of friction resin impregnated in at least part of said porous layer in bearing relation with said central bearing element between said element and said assembled ring.

3. The bearing assembly of claim 1 wherein said liner comprises:
   a tubular bushing of generally thermo-setting plastic composition material.

4. The bearing assembly of claim 1 wherein said outer bearing race ring is provided with a plurality of very shallow, steeply pitched, thread-like depressions oppositely inclined from opposite ends of said ring in said inner surface, said depressions becoming more shallow as they progress inwardly of said race ring to merge into said inner surface at spaced margins of a medial zone of said surface.

5. The bearing assembly of claim 1 wherein said shallow spiral depression in said race ring inner surface extends spirally therein from one end of said surface continuously to an opposite end thereof.

References Cited
UNITED STATES PATENTS

| | | | |
|---|---|---|---|
| 1,693,748 | 12/1948 | Fiegel | 308—72 |
| 2,372,203 | 3/1945 | Hensel. | |
| 2,704,234 | 3/1955 | Love | 308—241 X |
| 2,747,261 | 5/1956 | Stosuy. | |
| 2,798,005 | 7/1957 | Love. | |
| 2,804,679 | 9/1957 | Tracy | 308—72 |
| 2,857,656 | 10/1958 | Straub | 308—72 |
| 2,904,874 | 9/1959 | Norton | 29—149.5 |
| 2,952,144 | 9/1960 | Holmes | 308—72 X |
| 3,119,640 | 1/1964 | Laudig | 308—237 X |
| 3,126,613 | 3/1964 | Litsky | 308—72 X |
| 3,351,999 | 11/1967 | McCloskey | 29—149.5 |

FOREIGN PATENTS

| | | |
|---|---|---|
| 850,756 | 10/1960 | Great Britain. |
| 919,854 | 3/1947 | France. |
| 1,253,126 | 12/1960 | France. |

MARTIN P. SCHWADRON, *Primary Examiner.*

U.S. Cl. X.R.

308—237